W. E. ROSS.
DRESSING TOOL.
APPLICATION FILED OCT. 30, 1918.
1,343,876.
Patented June 15, 1920.
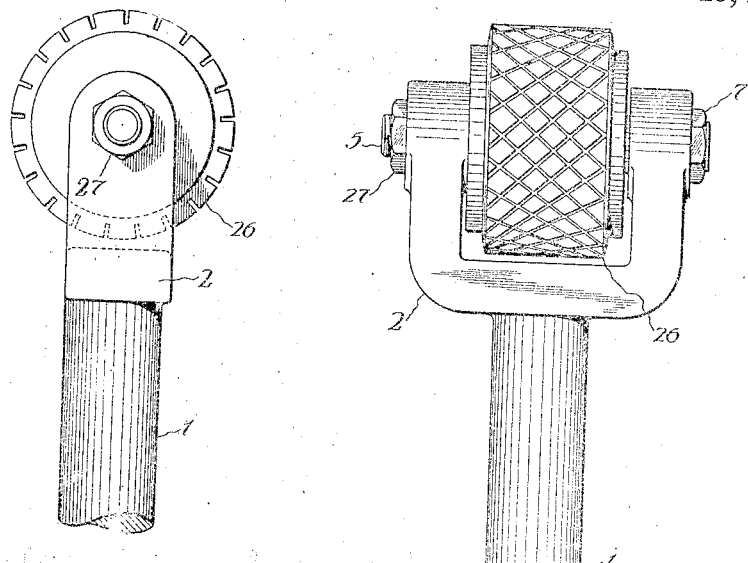
Fig. 1
Fig. 2
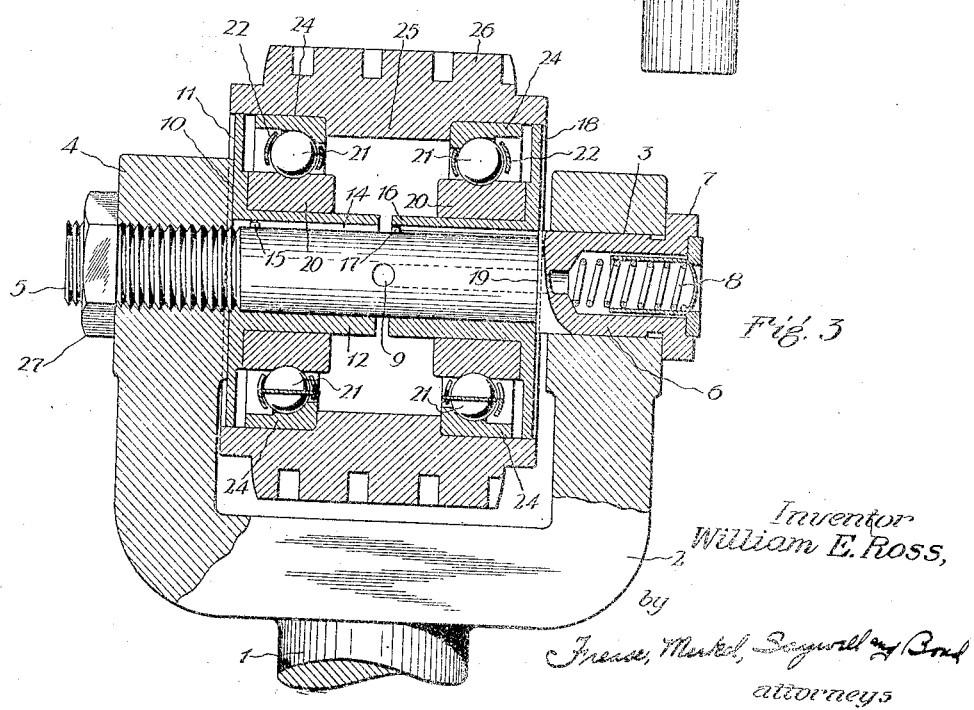
Fig. 3
Inventor
William E. Ross,
by
attorneys

UNITED STATES PATENT OFFICE.

WILLIAM E. ROSS, OF CLEVELAND, OHIO, ASSIGNOR TO THE ROSS MANUFACTURING COMPANY, OF CLEVELAND, OHIO, A CORPORATION OF OHIO.

DRESSING-TOOL.

1,343,876.  Specification of Letters Patent.  Patented June 15, 1920.

Application filed October 30, 1918. Serial No. 260,263.

*To all whom it may concern:*

Be it known that I, WILLIAM E. Ross, a citizen of the United States, residing at Cleveland, in the county of Cuyahoga and State of Ohio, have invented a new and useful Dressing-Tool, of which the following is a specification.

This invention relates to tools for dressing emery wheels, carborundum wheels and the like, such as shown and described in Patent No. 1,256,167 issued February 12, 1918, to The Ross Manufacturing Company, the object being to construct a dressing tool of this class that can be quickly and accurately adjusted to take up the wear in the bearings occasioned by the use of the tool.

With this object in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Figure 1 represents a side elevation of my improved dressing tool.

Fig. 2 represents a front elevation; and

Fig. 3 represents an enlarged sectional view.

Similar numerals of reference indicate corresponding parts throughout the several figures of the drawings.

In dressing emery wheels, carborundum wheels and the like by means of a tool such as is described in said above-mentioned patent, the severe strain thrown upon the tool causes the bearings to wear, resulting in a "chattering" of the tool and the consequent production of an uneven cutting face on the wheel to be dressed which, as will be readily understood by those skilled in the art, is particularly undesirable. In order to overcome this defect, I have constructed a dressing tool with a very accurate adjusting means by which the bearings upon which the cutting member rotates, may be perfectly adjusted.

In the illustrated embodiment of my invention, 1 indicates the stem or bit by means of which the tool is secured to a tool rest when in use. Formed upon the bit 1 is a substantially U-shaped yoke 2 with a cylindrical aperture 3 formed laterally through one of its arms near the extremity thereof. In the opposite arm and in alinement with the aperture 3 is a screw threaded aperture 4. A bolt member 5 having an enlarged cylindrical portion 6 and a hexagonal head 7 formed upon one extremity is designed to be inserted through the aperture 3, the opposite end of said bolt being screw-threaded and screwed into the threaded aperture 4. A lubricant valve of the common spring type is shown at 8 and communicates with the lubricant passage 9 formed longitudinally through a portion of the bolt 5 and designed for a purpose to be hereinafter set forth.

Fitting against the inner face 10 of one of the arms of the U-shaped member, is an annular flange 11 formed integral with a sleeve portion 12 which sleeve portion is designed to fit about the bolt 5 and has formed therein a key-way 14, a key 15 carried by the bolt fitting within the said key-way and securing the said sleeve against rotation upon the bolt. Spaced slightly from the inner extremity of the sleeve 12 is a similar sleeve 16, which likewise is provided with a key-way for receiving the key 17 secured in the bolt. An annular flange 18, identical with the flange 11, is formed upon the sleeve 16 and is designed to be engaged by a shoulder 19 formed by the enlargement 6 upon the bolt.

Upon each of the sleeves 12 and 16 is fitted an annular grooved ring 20, which rings form the inner cone members of ball bearings, the balls 21 of which are retained by the usual cage members 22. The outer cone members 24 of the said ball bearings are arranged to engage the opposite sides of an inwardly extending head 25 formed upon the inner face of a hollow cutting member 26. The outer side of one of the cone members 20 is arranged to lie in contact with the inner face of the annular flange 11, while the outer side of the opposite inner cone contacts with the inner face of the flange 18 and since the shoulder 19 upon the bolt is in constant contact with the outside of the flange 18, pressure exerted against the said flange 18 by the shoulder 19 will tend to tighten the ball bearing adjacent the flange 18, while similarly, the pressure exerted by the face 10 adjacent the flange 11, will cause the said flange 11 to tighten the ball bearing adjacent it.

Threaded upon the free end of the bolt 5 is an ordinary hexagonal nut 27 which acts as a lock nut to position the bolt 5 after its end has been threaded through the aperture 4, to the desired point to properly adjust the bearings. By inserting the nozzle of an ordinary oil can in the lubricating valve 8, oil will be forced through the oil passage 9 and into the hollow space within the cylindrical cutting member. It will find its way from here into the ball bearings, thus supplying lubricant to insure an easy operation of the device.

It will be obvious that as the bolt 5 is turned to feed its threads into the threaded aperture 4, the shoulder 19 will exert a pressure against the sleeve 16, this pressure forcing the sleeve 16 and the inner cone member 20 carried by the said sleeve, inwardly. At the same time, the tightening effected by the pressure of the head 7 against the outer side of the arm of the U-shaped member, adjacent the said head, will exert an inward pressure upon the opposite arm, which pressure is transmitted to the sleeve 12 thereby moving the cone member 20 carried by the said sleeve 12, inwardly. In the figures of the drawing the parts are illustrated in a position in which the bolt 5 has reached the limit of its adjustability.

It will also be seen that by using a pair of ball bearings spaced a considerable distance apart, and providing an absolutely exact adjustment for each of the said bearings the rotary cutting member is perfectly supported at each side.

Having now described my invention, what I claim is—

1. In a tool for dressing grinding wheels, in combination, a rotary dressing tool, a yoke, a shouldered shaft in said yoke, ball bearings for said tool, and means whereby adjustment of said bearings between the shoulder of the shaft and one of the arms of the yoke is effected.

2. In a tool for dressing grinding wheels, the combination of a rotatable member, a supporting device, a shaft for said rotatable member fixed in said device, a pair of antifriction bearings interposed between the rotatable member and supporting device, and means for compensating for the wear in the bearing surfaces by varying the relation of the shaft to the supporting device.

3. In a tool for dressing grinding wheels, the combination of a rotatable member, a supporting device, a shaft fixed in said device, a pair of antifriction bearings interposed between the rotatable member and the shaft in the supporting device, and means coöperating with the supporting device whereby the bearings may be adjusted by varying the relation of the shaft to the device.

4. In a tool for dressing grinding wheels, the combination of a rotatable member, a yoke-shaped supporting device, a shouldered shaft in the arms of said device for said member, a pair of antifriction bearings interposed between the rotatable member and the supporting device and respectively disposed adjacent to the two sides of the rotatable member, and means coöperating with the supporting device and shaft whereby the bearings may be adjusted by varying the distance between the shoulder on the shaft and the supporting device.

5. In a tool for dressing grinding wheels, the combination of a rotatable member, a supporting device including an adjustably mounted shaft member, a pair of antifriction bearings interposed between the rotatable member and said shaft member, a shoulder being provided on said shaft member, and means for adjusting the said shaft member lengthwise so as to vary the relation of the shoulder to another part of the supporting device, the adjustment of said shaft member being adapted to effect compensation for all wear in the bearings.

6. In a tool for dressing grinding wheels, the combination of a rotatable member, a supporting device including a pair of arms, and a shouldered screw ended shaft mounted in one of said arms and passing through the other arm with the shoulder inside its face, a pair of antifriction bearings interposed between the rotatable member and said shaft member and disposed respectively adjacent to the two sides of the said rotatable member so as to vary the distance between the shoulder and the face of an arm, and means for adjusting said shaft member, the adjustment of the latter being adapted to effect compensation for wear in said bearings.

7. In a tool for dressing stones in combination, a rotary dressing member, a yoke, a shouldered shaft for said member mounted in said yoke, with the shoulder extending beyond the inner face of one arm of the yoke and having adjustable relation to the opposite arm of the yoke, a pair of bearings between the rotary member and the shaft, the inner cone members of said bearings being mounted in sliding relation to the shaft so that their distance between each other may be varied by varying the distance between the shoulder and the opposite arm, and means for varying said distance.

8. In a tool for dressing grinding wheels, in combination, a rotatable member, a screw-ended shouldered shaft for said rotatable member, a yoke shaped supporting device in which said shaft is mounted and into one of the arms of the yoke of which the screw end of said shaft takes, ball bearings for said rotating device, and means whereby on turning the shaft adjustment of said bearings is effected by varying the distance between the shoulder and that arm of the yoke into which the screw end of the shaft takes.

In testimony that I claim the above, I have hereunto subscribed my name.

WILLIAM E. ROSS.